(12) United States Patent
Kawai et al.

(10) Patent No.: US 8,010,785 B2
(45) Date of Patent: Aug. 30, 2011

(54) INFORMATION PROCESSING APPARATUS

(75) Inventors: Sunao Kawai, Aichi (JP); Masafumi Miyazawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 950 days.

(21) Appl. No.: 11/614,099

(22) Filed: Dec. 21, 2006

(65) Prior Publication Data

US 2007/0150738 A1 Jun. 28, 2007

(30) Foreign Application Priority Data

Dec. 28, 2005 (JP) ................................. 2005-380153

(51) Int. Cl.
*H04L 29/06* (2006.01)

(52) U.S. Cl. ....................................... 713/156; 713/176

(58) Field of Classification Search .................. 713/156, 713/176

See application file for complete search history.

(56) References Cited

U.S. PATENT DOCUMENTS

| | | | | |
|---|---|---|---|---|
| 5,287,521 A * | 2/1994 | Nitta et al. | ..................... | 710/200 |
| 6,901,512 B2 * | 5/2005 | Kurn et al. | ..................... | 713/164 |
| 7,069,586 B1 * | 6/2006 | Winneg et al. | .................. | 726/16 |
| 7,206,935 B2 * | 4/2007 | Scott | ............................. | 713/170 |
| 7,925,697 B2 * | 4/2011 | Futa et al. | ..................... | 709/204 |
| 2003/0065619 A1 | 4/2003 | Shitano | | |
| 2003/0110262 A1 * | 6/2003 | Hasan et al. | .................. | 709/226 |
| 2004/0025015 A1 * | 2/2004 | Satterlee et al. | ............. | 713/164 |
| 2005/0120237 A1 * | 6/2005 | Roux et al. | ..................... | 713/200 |
| 2005/0185217 A1 * | 8/2005 | Nishizawa et al. | .......... | 358/1.15 |
| 2005/0273852 A1 * | 12/2005 | Ferlitsch | ......................... | 726/17 |
| 2006/0107039 A1 * | 5/2006 | Sugiura et al. | ................ | 713/156 |
| 2006/0236108 A1 * | 10/2006 | Andrews | ........................ | 713/170 |
| 2008/0040795 A1 * | 2/2008 | Winneg et al. | .................. | 726/16 |
| 2009/0007233 A1 * | 1/2009 | Smith | ............................... | 726/2 |
| 2009/0013409 A1 * | 1/2009 | Wenzinger et al. | ............. | 726/24 |

FOREIGN PATENT DOCUMENTS

| | | | |
|---|---|---|---|
| EP | 1560109 A1 | | 8/2005 |
| EP | 1574930 A2 | | 9/2005 |
| JP | 2002169433 A | | 6/2002 |
| JP | 2003141085 | * | 5/2003 |
| JP | 2003141085 A | | 5/2003 |

(Continued)

OTHER PUBLICATIONS

Notification of Reasons for Rejection received in corresponding Japanese Application No. 2005-380153.

(Continued)

*Primary Examiner* — David García Cervetti
(74) *Attorney, Agent, or Firm* — Baker Botts L.L.P.

(57) ABSTRACT

There is provided an information processing apparatus comprising a process execution unit, a designated information obtaining unit to obtain designated information relating to authority for use, a certificate generating unit to generate a digital certificate which has a range of authority for use and is attached with a digital signature, a certificate outputting unit to output the generated digital certificate, a certificate obtaining unit to obtain a digital certificate from a predetermined resource device, a validity judgment unit to judge whether the digital certificate is valid based on the digital signature attached to the digital certificate, and an authorization unit to authorize the process execution unit to execute valid process for a predetermined period.

9 Claims, 11 Drawing Sheets

FOREIGN PATENT DOCUMENTS

| | | | |
|---|---|---|---|
| JP | 2003204512 A | | 7/2003 |
| JP | 2004247799 A | | 9/2004 |
| JP | 2005-159726 | * | 6/2005 |
| JP | 2005159726 A | | 6/2005 |
| JP | 2005217813 A | | 8/2005 |
| JP | 2005244488 A | | 9/2005 |
| JP | 2005309888 A | | 11/2005 |
| JP | 2007174395 A | | 7/2007 |

OTHER PUBLICATIONS

European Patent Office, European Search Report for EP Appl'n No. 06026480 (counterpart to above-captioned patent appl'n) mailed May 3, 2007.

European Patent Office, Office Action for European Patent Application No. 06026480.1 (counterpart to above-captioned patent application), dated Apr. 20, 2011.

* cited by examiner

CLIENT CERTIFICATE ISSUANCE

USER ID — Suzuki

PLEASE CHECK ITEMS TO GRANT

- ☐ MANAGEMENT
- ☑ MONOCHROME PRINT
- ☐ COLOR PRINT
- ☑ MONOCHROME COPY
- ☐ COLOR COPY
- ☑ FAX TRANSMISSION
- ☑ SCANNER

OUTPUT DESTINATION
- ● USB MEMORY
- ○ BUILT-IN MEMORY ( ISSUE )

FIG. 4

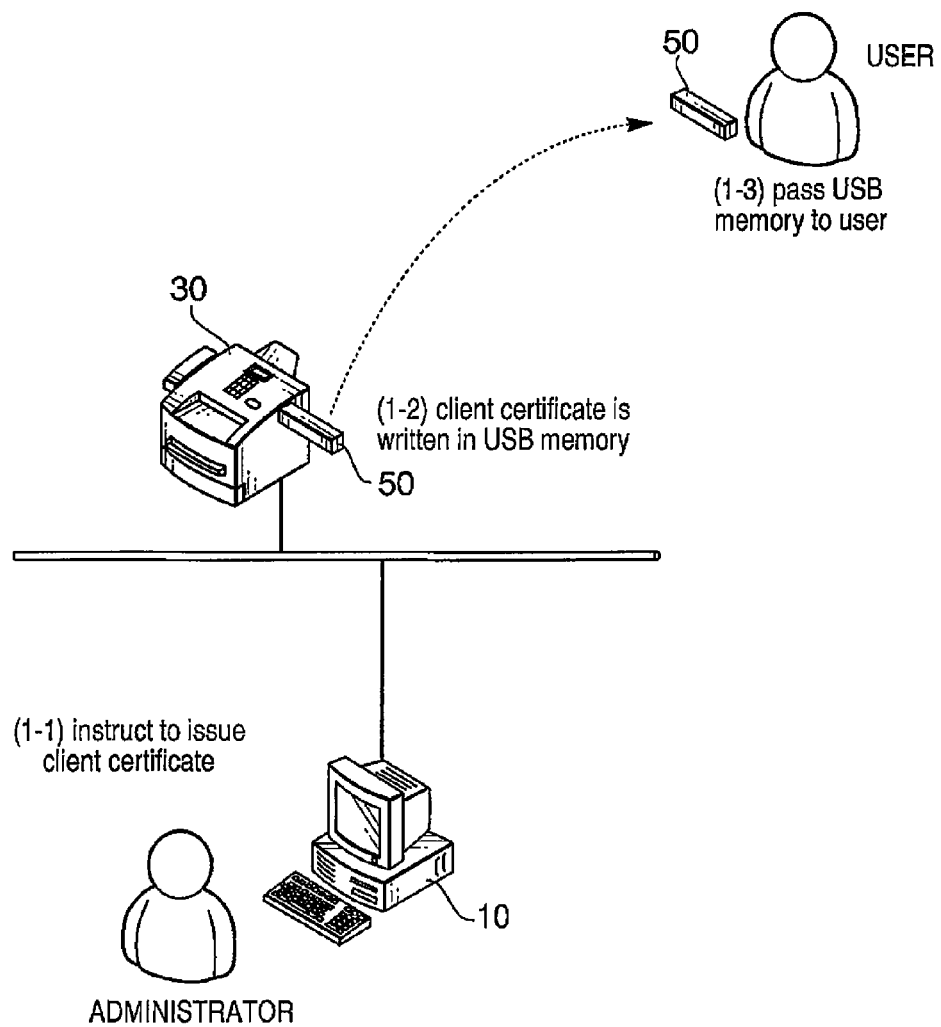

INFORMATION PROCESSING APPARATUS

CROSS REFERENCE TO RELATED APPLICATION

This application claims priority under 35 U.S.C. §119 from Japanese Patent Application No. 2005-380153, filed on Dec. 28, 2005. The entire subject matter of the application is incorporated herein by reference.

BACKGROUND

1. Technical Field

Aspects of the present invention relate to an information processing apparatus which is capable of partially restricting the use of processes.

2. Related Art

Conventionally, an information processing apparatus having a plurality of functions called "multi function device" has been widely used. As for this type of information processing apparatus, a digital MFP (multiple function peripheral) is known, which is provided with a printing function (printer), a scanning function, and a copying function. Such digital MFP is, for example, configured to execute a printing process and forming images based on designated print data in responding to an inputted print instruction, and to execute a scanning process and scanning a designated document optically and generates image data for indicating a scanned image in responding to an inputted scanning instruction.

However, such type of information processing apparatus operates a mix of high running-cost process such as a printing process in which paper is consumed for the operation and low running-cost process, therefore, it may be inconvenient in respect of operation cost if granting authority for use on all processes to all users. Additionally, in the information processing apparatus of above type, it may be also inconvenient depending on the installation site if allowing all processes to use.

Thus, a function capable of partially restricting use of process is provided in such type of information processing apparatus sometimes. For example, a function of granting each different authority for use to every user so as to be capable of switching between execution/un-execution with respect to each user may be provided in the above-mentioned information processing apparatus. One of such type of information processing apparatuses is disclosed in Japanese Patent Provisional Publication No. 2005-244488 (hereafter, referred to as JP 2005-244488A). An information processing apparatus disclosed in JP 2005-244488A stores information indicating authority for use with respect to each user, and partially restricts use of process based on the information indicating aforementioned authority for use corresponding to the user who has been identified based on authentication information inputted from outside by.

However, in conventional apparatus, management of the information which indicates the aforementioned authority for use is not strict, and there is a possibility that the information which indicates authority for use may be tampered easily.

SUMMARY

Aspects of the present invention are advantageous in that an information processing apparatus having a plurality of processes and being configured to prevent tampering of information indicating authority for use and to prevent unauthorized use of an information processing apparatus securely.

BRIEF DESCRIPTION OF THE ACCOMPANYING DRAWINGS

FIG. 4 is a schematic view showing a client certificate issuance screen to be displayed based on a certificate issuance page.

FIG. 5 is an explanatory diagram showing a technique to grant authority for use to a user.

DETAILED DESCRIPTION

General Overview

Figure 1:
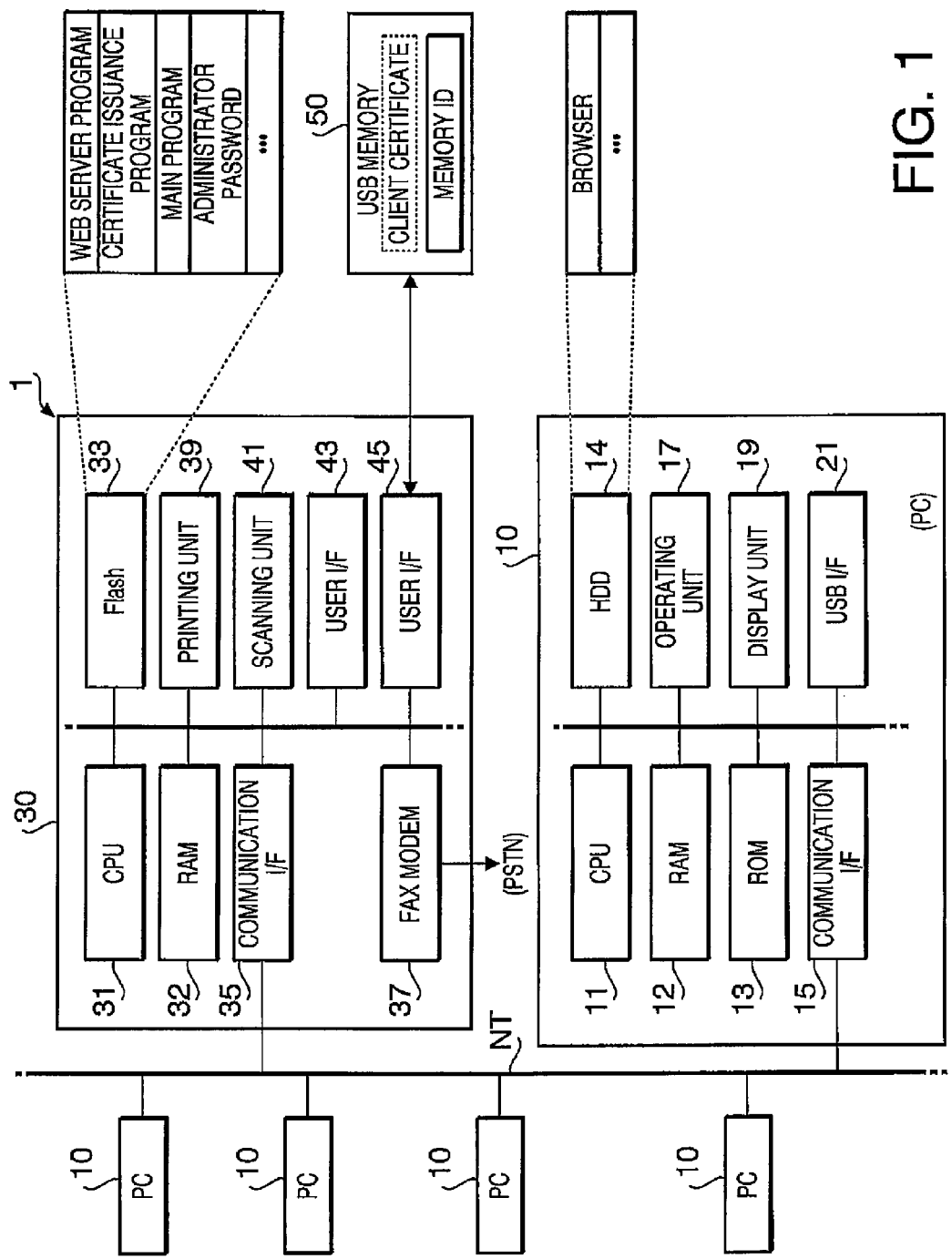
FIG. 1 is a schematic block diagram showing a configuration of a communication system according to a first embodiment.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an information processing apparatus, which comprises a process execution unit configured to execute processes corresponding to instructions inputted from an external device through an interface, a designated information obtaining unit configured to obtain designated information through the interface. The designated information includes data relating to authority for use of the information processing apparatus. The information processing apparatus further comprises a certificate generating unit configured to generate a digital certificate with a digital signature. The digital certificate includes a range of the authority for use of the information processing apparatus. The information processing apparatus further comprises a certificate outputting unit configured to output the generated digital certificate to a predetermined destination device, a certificate obtaining unit configured to obtain a digital certificate from a predetermined resource device, a validity judgment unit configured to judge whether the digital certificate obtained by the certificate obtaining unit is valid based on the digital signature attached to the digital certificate, and an authorization unit configured to authorize the process execution unit to execute valid processes for a predetermined period, the valid processes belonging to the range of the authority for use of the valid digital certificate.

The range of authority for use of the information processing apparatus is written in the digital certificate in order to execute the processes which belong to the range of authority for use written in the valid digital certificate selectively on a process execution unit, and that unauthorized use such as by tampering of the information indicating the range of authority for use may not occurred in the information processing apparatus. Simply, a digital certificate in which information has been tampered is to be no longer judged as a valid digital certificate by the validity judgment unit, and that may eliminate false authorization from the authorization unit. Thus, according to the above mentioned configuration, unauthorized use of the information processing apparatus such as by tampering of information indicating the range of authority for use may be prevented more securely than ever before.

The information processing apparatus described above may be configured such that the authorization unit authorizes to execute the processes which belong to the range of authority for use indicated by the digital certificate within a period from the time of obtaining a valid digital certificate to a predetermined time that elapses, or to a termination period of a predetermined number of times of processes (e.g. once).

In at least one aspect, the authorization unit is configured to authorize execution of the valid processes continuously during a capable period for obtaining the valid digital certificate from the predetermined resource device.

The information processing apparatus according to above configuration may authorize execution of the processes which belong to the range of authority for use written in the valid digital certificate continuously during a capable period for obtaining the valid digital certificate from the predetermined resource device, so that the user side is not necessary to execute input operation of the digital certificate repeatedly on the information processing apparatus. Also, the information processing apparatus side is not necessary to execute verification operation on contents of the digital certificate repeatedly. Therefore, the processing-load on the operations will be reduced.

The abovementioned predetermined destination device is, for example, a built-in storage unit in this information processing apparatus and an external storage unit.

In at least one aspect, the predetermined destination device is a built-in storage unit in the information processing apparatus. The certificate obtaining unit is configured to obtain the digital certificate from the built-in storage unit.

The information processing apparatus according to above configuration may preserve the information indicating the range of authority of use inside the apparatus in safe. However, to preserve the digital certificate inside the information processing apparatus, it may not be so easy to grant authority for use to each individual user. To put it plainly, it is necessary to use identification data such as a user ID and a password to execute user authentication by the information processing apparatus side in the case of granting each different authority for use with respect to each user. On the other hand, it is not necessary to ask users for inputting identification data such as a user ID and a password in the case of executing user authentication based on the digital certificate by providing a digital certificate to each user in advance.

In at least one aspect, the predetermined destination device is an external unit configured to communicate with the information processing apparatus. The process execution unit is configured to execute the valid processes corresponding to the instructions inputted from the external unit through the interface. Further, the certificate obtaining unit is configured to obtain the digital certificate from the external unit through the interface.

In this configuration of the information processing apparatus, it is capable of outputting the digital certificate to the external unit of each user, and that allows to switch between execution/un-execution of processes based on the digital certificate of each user by obtaining the digital certificate of each user through the external unit in advance. Thus it may establish a system in which it is capable of granting an authority for use to each individual user precisely.

The external unit mentioned above as the predetermined obtaining destination device is not necessary to be same as the external unit as the predetermined destination device. A digital certificate may be transmitted from the external unit as the predetermined destination device to the external unit as the predetermined resource device. As for the external unit here, as output destination unit, a portable storage unit may be included (USB memory etc.).

If a portable storage unit is adopted as the destination unit, the information processing apparatus above may be configured to obtain the digital certificate from this portable storage unit.

In at least one aspect, the information processing apparatus further comprises a port removably connectable with a portable storage unit. In this configuration, the certificate outputting unit is configured to output the generated digital certificate to the portable storage unit through the port, and the certificate obtaining unit is configured to obtain the digital certificate from the portable storage unit in response to connection of the portable storage unit with the port.

This technique of recording a digital certificate on a portable storage unit then switching between execution/un-execution of processes based on the digital certificate may achieve to grant each different authority for use to each user respectively by providing a portable storage unit stored with the digital certificate to every user. Therefore, a system in which it is capable of switching between execution/un-execution of processes for users respectively can be formed in a simple configuration.

Moreover, the aforementioned information processing apparatus may be configured to be capable of switching among destination units according to instructions by users. That is, based on premises that the designated information obtained by the designated information obtaining unit includes information to designate the built-in storage unit in this information processing apparatus or to designate the portable storage unit connected to the port, as the predetermined output destination device, the information processing apparatus may be configured as described below.

In at least one aspect, the designated information includes information to designate as the predetermined destination device a built-in storage unit in the information processing apparatus or the portable storage unit connected to the port. The certificate outputting unit is configured to output the generated digital certificate to a storage unit indicated in the designated information. The certificate obtaining unit is configured to obtain the digital certificate from the portable storage unit in response to connection of the portable storage unit to the port. The certificate obtaining unit is further configured to obtain the digital certificate from the built-in storage unit if the digital certificate is stored in the built-in storage unit. Further, the authorization unit is configured to authorize the process execution unit to execute the valid processes during a capable period for obtaining the valid digital certificate from the portable storage unit, if both the digital certificate obtained from the built-in storage unit and the digital certificate obtained from the portable storage unit are valid. The valid processes belong to at least one of the range of the authority of the digital certificate obtained from the built-in storage unit and the range of the authority of the digital certificate obtained from the portable storage unit.

According to above configuration, the information processing apparatus grants execution of processes which belong to the range of authority for use based on the digital certificate stored in a built-in storage unit and the digital certificate stored in a portable storage unit, so that even an unspecified user whom the digital certificate is not issued may use some processes, and the users whom the digital certificate is issued may use wider range of processes corresponding to the user based on the digital certificate.

In the case of storing the digital certificate in a portable storage unit, specifically, the information processing apparatus may be configured as described below, so that the digital certificate as an electrical entity may be associated one to one with the aforementioned portable storage unit as a material existence.

In at least one aspect, the portable storage unit has an identification code unique to the portable storage unit. The certificate outputting unit is configured to encrypt the digital certificate based on the identification code and then to output the encrypted digital certificate to the portable storage unit. The validity judgment unit is configured to decrypt the encrypted digital certificate based on the identification code stored in the portable storage unit. The validity judgment unit is further configured to judge whether the digital certificate is valid based on the decrypted digital certificate if the certificate obtaining unit obtained the encrypted digital certificate from the portable storage unit.

To put it plainly, according to the information processing apparatus, even if a digital certificate has been copied to any other storage unit than the portable storage unit from which the digital certificate was outputted by the certificate outputting unit, the copied digital certificate cannot be decrypted and the digital certificate is not judged as a valid digital certificate by the validity judgment unit. Therefore, occurrence of misuse of the information processing apparatus such as by a fraud copy of the digital certificate may be prevented.

In the case of storing the digital certificate in a portable storage unit, specifically, the information processing apparatus may be configured as described below, so that the digital certificate as an electrical entity may be associated one to one with the aforementioned portable storage unit as material existence.

In at least one aspect, the portable storage unit has an identification code unique to the portable storage unit. The certificate generating unit is configured to generate the identification code. The certificate outputting unit is configured to output the digital certificate with the digital signature and the identification code to the portable storage unit. The validity judgment unit is configured to judge whether the digital certificate is valid based on the digital signature and the identification code of the digital certificate if the certificate obtaining unit obtained the digital certificate from the portable storage unit. The validity judgment unit is further configured to determine the digital certificate is not valid if the identification code of the digital certificate obtained by the certificate obtaining unit does not match the identification code stored in the portable storage unit.

Thus, according to the information processing apparatus, occurrence of misuse of the information processing apparatus such as by a fraud copy of the digital certificate may be prevented.

According to another aspect of the invention, there is provided a method for authorization of process execution to be implemented on a computer functioning as an information processing apparatus having a process execution unit to execute processes. The method comprises obtaining designated information through an interface. The designated information includes data relating to authority for use of the information processing apparatus. The method further comprises generating a digital certificate with a digital signature. The digital certificate includes a range of the authority for use of the information processing apparatus. The method further comprises: outputting the generated digital certificate to a predetermined destination device; obtaining a digital certificate from a predetermined resource device; judging whether the digital certificate is valid based on the digital signature attached to the digital certificate; and authorizing the process execution unit to execute valid processes for a predetermined period. The valid processes belong to the range of authority for use of the valid digital certificate.

A digital certificate in which information has been tampered is to be no longer judged as a valid digital certificate by the validity judgment unit, and that may eliminate false authorization from the authorization unit. Thus, according to the above mentioned configuration, unauthorized use of the information processing apparatus such as by tampering of information indicating the rage of authority for use may be prevented more securely than ever before.

According to another aspect of the invention, there is provided a computer readable medium having computer readable instructions stored thereon, which, when executed by a computer functioning as an information processing apparatus having a process execution unit to execute processes, are configured to execute corresponding to instructions inputted from an external device through an interface, to obtain designated information through the interface. The designated information includes data relating to authority for use of the information processing apparatus. The instructions are further configured to generate a digital certificate with a digital signature. The digital certificate includes a range of the authority for use of the information processing apparatus. The instructions are further configured to output the generated digital certificate to a predetermined destination device, to obtain a digital certificate from a predetermined resource device, to judge whether the digital certificate is valid based on the digital signature attached to the digital certificate, and to authorize the process execution unit to execute valid processes for a predetermined period. The valid processes belong to the range of the authority for use of the valid digital certificate.

A digital certificate in which information has been tampered is to be no longer judged as a valid digital certificate by the validity judgment unit, and that may eliminate false authorization from the authorization unit. Thus, according to the above mentioned configuration, unauthorized use of the information processing apparatus such as by tampering of information indicating the range of authority for use may be prevented more securely than ever before.

EMBODIMENT

Hereinafter, referring to accompanying drawings, embodiments of the present invention will be described.

First Embodiment

FIG. 1 is a schematic block diagram showing a configuration of a communication system 1 according to a first embodiment. The communication system 1 includes a digital MFP (Multifunction Peripheral) 30 configured as an information processing apparatus. As shown in FIG. 1, the communication system 1 according to the embodiment is configured such that a plurality of personal computers (hereafter referred to as "PC".) 10, and the digital MFP 30 are connected to a network NT.

PC 10 is provided with a CPU 11 which executes various programs, a RAM 12 as a work memory, ROM 13 which is stored with various programs such as a boot program, a hard disk drive (HDD) 14, a communication I/F 15 which is connected to network NT, the operating unit 17 having various devices such as a keyboard and a pointing device, a display unit 19 such as an LCD monitor, and a USB I/F 21 which is capable of removably connectable with various USB (Universal Serial Bus) devices.

The PC 10 is provided with a multitasking OS in the HDD 14, and application software such as a browser which is capable of displaying of a web page, and executes corresponding processes according to the input signals from the operating unit 17. For example, if an activation command of a browser is inputted through the operating unit 17, the PC 10 is to activate the browser and displays a dedicated window for this browser on the display unit 19. Also, according to the operation to this window, for example, the PC 10 obtains a web page which is designated by a user from a corresponding web server. And the PC 10 displays a screen in the window based on the web page. In addition, in the communication system 1 according to the embodiment, the MFP 30 has a function as a web server.

As shown in FIG. 1, the MFP 30 is provided with a CPU 31 which executes various programs, a RAM 32 as a work memory, and a flash memory 33 which is stored with various programs and data, a communication I/F 35 which is connected to network NT, and a FAX MODEM 37 which is connected to a public switched telephone network (PSTN) and is capable of facsimile communication with external facsimile machines, a printing unit 39 which forms color or monochrome images on paper using a laser printing method or an ink-jet printing method, and a scanning unit 41 which reads a document placed on a platen optically and generates image data, and a user I/F 43 which is provided with various keys and a display unit which are operable by users, and a USB I/F 45 which is capable of removably connectable with various USB devices.

The MFP 30 executes various programs under control of the CPU 31, and achieves various functions including a printing function, a scanning function, a copying function, and FAX transmission and reception functions and a web server function. For example, in the case of receiving print data from an external PC 10 through the communication I/F 35, the CPU 31 is to execute a printing process by controlling the printing unit 39 to form print images on paper based on the print data (printing function). In addition, in the case of receiving print data with a monochrome printing instruction, the PC 10 is to execute a monochrome printing process to print the received print data in monochrome, and in the case of receiving print data with a color printing instruction, the PC 10 is to execute a color printing process to print the received print data in color.

Also, if a scanning instruction is inputted from the user I/F 43 according to an operation of a user on the user I/F 43, the CPU 31 is to execute a scanning process by controlling the scanning unit 41 to generate a print data which indicates scanned image of a document placed on a platen, then transmits the data to a predetermined PC 10 through the communication I/F 35 (scanning function).

Further, if a copying instruction is inputted from a user I/F 43 according to an operation of a user on the user I/F 43, the CPU 31 executes a copying process by scanning a document placed on a platen in the scanning unit 41 to print the scanned image on paper in the printing unit 39 (copying function). In addition, if a monochrome copying instruction is inputted as a copying instruction, the PC 10 is to execute a monochrome copying process to print the scanned image in monochrome in the printing unit 39, if a color copying instruction is inputted as a copying instruction, the PC 10 is to execute a color copying process to print the scanned image in color in the printing unit 39.

Moreover, if a FAX transmission instruction is inputted from the user I/F 43 according to an operation of a user on the user I/F 43, the CPU 31 is to execute a FAX transmission process by scanning a document placed on a platen in the scanning unit 41 to generate facsimile data which indicates the scanned image, then transmits the data to a facsimile machine of a designated destination telephone number through FAX MODEM 37 (FAX transmission function).

Furthermore, the CPU 31 of the MFP 30 functions as a web server by execution of a web server program which is stored in the flash memory 33, and if any access occurred to a specific program which is controlled by the web server, the CPU 31 executes a user authentication by executing a management tool providing process, then transmits the web page for displaying a management screen to the access source PC 10. Thus, the tool for managing this MFP 30 is to be provided to an administrator through the web server (management tool providing function).

Additionally, the MFP 30 according to the embodiment is configured to authenticate the administrator based on a client certificate or an administrator password, and is provided with an encrypted administrator password in the flash memory 33. Also, the CPU 31 of the MFP 30 has a certificate issuance program for issuing a client certificate in a flash memory 33. Further, the communication system 1 according to the embodiment is configured to authenticate also users other than the administrator by using a client certificate, and executes restricting the use of a printing function, a scanning function, a copying function, and a FAX transmission function, which are provided in the MFP 30, with respect to each user.

Figure 2:
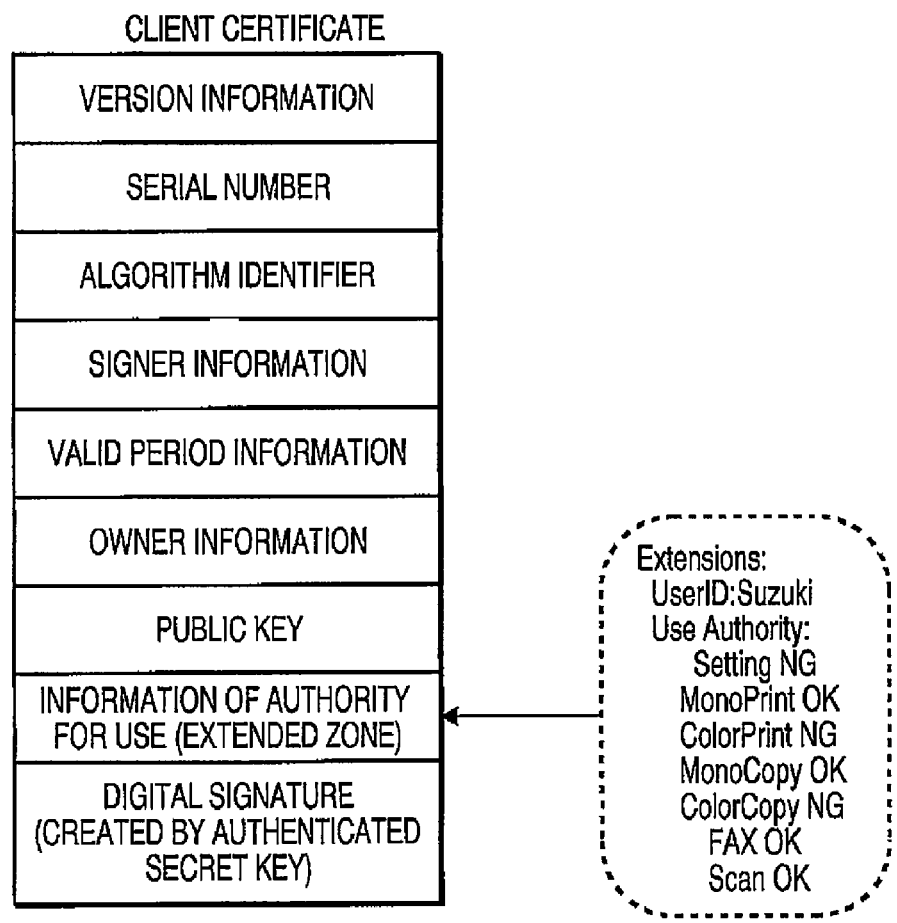
FIG. 2 is a schematic diagram showing a configuration of a client certificate to be issued by a multifunction peripheral provided in the communication system.
Figure 3:
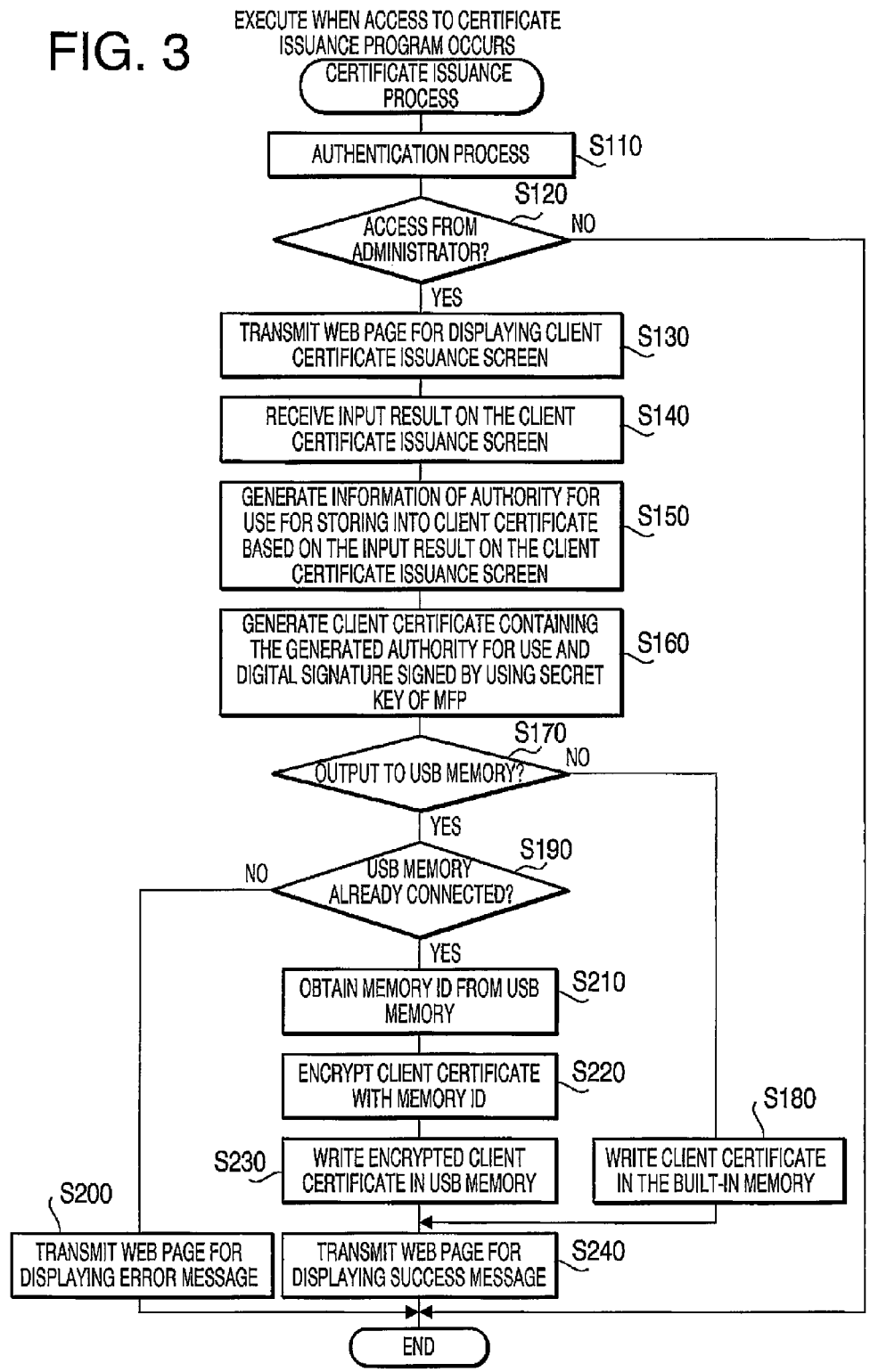
FIG. 3 is a flowchart showing a certificate issuance process to be executed by the multifunction peripheral.

FIG. 2 is a schematic diagram showing a configuration of a client certificate to be issued by the MFP 30; and FIG. 3 is a flowchart showing a certificate issuance process based on the aforementioned certificate issuance program to be executed by the CPU 31 of the MFP 30. In this regard, the certificate issuance process is executed as one of management tool providing processes described above.

As shown in FIG. 2, a client certificate to be issued by the MFP 30 has version information which indicates the version of the certificate, a serial number of the certificate, an algorithm identifier, signer information which indicates the certificate issuer who signed the digital signature, valid period information which indicates the period of validity of the certificate, owner information which indicates the certificate owner, public key information which indicates the public key of the owner, information of authority for use which indicates the range of authority for use of the MFP 30 granted to the owner, and digital signature information.

As is generally known, digital signature information is an encrypted hash value derived from other information in a client certificate by a server secret key, and the MFP 30 according to this embodiment has the server secret key and its corresponding server public key in the flash memory 33. Thus, the MFP 30 can judge correctly whether the client certificate is tampered, by decrypting the digital signature information using the server public key, and comparing the hash value indicated with the digital signature information and the hash value derived from other information in the client certificate.

As shown in FIG. 2, information of authority for use stored in the client certificate is provided with a user ID of the owner, the parameter value which indicates whether the aforementioned management tool providing function is available or unavailable, a parameter value which indicates whether a monochrome printing function is available or unavailable, a parameter value which indicates whether a color printing function is available or unavailable, a parameter value which indicates whether a FAX transmission function is available or unavailable, and a parameter value which indicates whether a scanning function is available or unavailable. In this regard, each parameter for indicating availability is set in a value indicating any one of "permission of use" (shown as "OK" in the figure)/"ban of use" (shown as "NG" in the figure).

If any access to the certificate issuance program from external PC 10 occurred through the communication I/F 35, the MFP 30 according to the embodiment executes a certificate issuance process under control of the CPU 31, and issues the client certificate.

At the start of the certificate issuance process, the CPU 31 executes an authentication process in the step S110, and judges whether the user who operates the access source PC 10 is an administrator (S120). Specifically, the CPU 31 requests a user who operates the access source PC 10 for an administrator password and obtains the administrator password from the access source PC 10, and verifies the obtained password and the administrator password which is stored in the flash memory 33 (S110). And then, if the both passwords are matched, the CPU 31 judges that the user who operates the access source PC 10 is the administrator (S120: YES), and if both passwords are not matched, judges that the user who operates the access source PC 10 is not the administrator (S120: NO).

Also, in the case the client certificate is transmitted from the PC 10 at the time of the aforementioned access, the CPU 31 judges whether the user who operates the access source PC 10 is an administrator based on the client certificate (S120). Specifically, in the case that the received client certificate is not tampered and the parameter value which indicates availability of the aforementioned management tool providing function is set in "permission of use (OK)", the PC 10 judges that the user who operates the access source PC 10 is an administrator (S120: YES), and judges that the user who operates the access source PC 10 is not an administrator in other cases (S120: NO).

And if the user who operates the access source PC 10 is judged as not an administrator, the CPU 31 terminates the certificate issuance process, and rejects access from the access source PC 10 described above.

On the other hand, in the case that the user who operates the access source PC 10 is judged as an administrator, control proceeds to the step S130 where the CPU 31 transmits a certificate issuance page which is a web page for displaying a client certificate issuance screen shown in FIG. 4 to the access source PC 10 through the communication I/F 35. In addition, when the aforementioned certificate issuance page is received and a displayed process is executed by the PC 10, the certificate issuance page configured as shown in FIG. 4 is to be displayed on the display unit 19 of the PC 10. FIG. 4 is a schematic view showing a client certificate issuance screen to be displayed by the browser in the PC 10 based on the certificate issuance page.

As shown in FIG. 4, a client certificate issuance screen has a text box for inputting a user ID, check boxes for setting values of the parameters which indicate availability of the respective functions, and radio buttons for selecting an output destination of the client certificate.

Specifically, as for check boxes, the client certificate issuance screen has a check box for setting a value of the parameter which indicates whether a management tool providing function is available or unavailable, a check box for setting a value of the parameter which indicates whether a monochrome printing function is available or unavailable, a check box for setting a value of the parameter which indicates whether a color printing function is available or unavailable, a check box for setting a value of the parameter which indicates whether a monochrome copying function is available or unavailable, a check box for setting a value of the parameter which indicates whether a color copying function is available or unavailable, a check box for setting a value of the parameter which indicates whether a FAX transmission function is available or unavailable, a check box for setting a value of the parameter which indicates whether a scanning function is available or unavailable. And as for radio buttons, a radio button for setting the output destination to the USB memory 50, and a radio button for setting the output destination to the built-in memory (flash memory 33) of the MFP 30 are provided for selecting output destination of the client certificate.

Moreover, the client certificate issuance screen has "ISSUE" button for transmitting the data (POST request) in which the values (input values) of respective input objects (the aforementioned text box, check boxes, and radio buttons) are written, and by the pressing operation of a user (administrator) on the "ISSUE" button through the operating unit 17, the data written with the values of respective input objects is to be transmitted from the PC10.

Therefore, after the end of the step S130, the CPU 31 of the MFP 30 receives the aforementioned data transmitted from the PC 10 (S140), and generates information of authority for use for writing in the client certificate according to the received data. Specifically, the CPU 31 writes the user ID according to the value in the text box, and generates the aforementioned information of authority for use which is written with the values of corresponding parameters according to the values of respective check boxes (S150). In this regard, if the check box is checked, corresponding parameter is to be set in "permission of use", and if the check box is not checked, corresponding parameter is to be set in "ban of use".

Then, after the end of the step, the CPU 31 creates a client certificate which is stored with the generated information of authority for use as above that is the aforementioned client certificate signed with a digital signature by the server secret key of the MFP 30 (S160).

Additionally, after the end of the step S160, the CPU 31 judges whether the USB memory 50 is designated as the output destination of the client certificate by the user (administrator) based on the value of the radio buttons (the value is indicated by checked or unchecked) stored in the received data from the PC 10 (S170). To put it plainly, when the radio button corresponding to the USB memory 50 is selected on the client certificate issuance screen, it is judged that the USB memory 50 is designated as the output destination (S170: YES). On the other hand, when the radio button corresponding to the built-in memory is selected on the client certificate issuance screen, it is judged that the built-in memory is designated as the output destination (S170: NO).

Then, if it is judged that the built-in memory is designated as the output destination (S170: NO), the CPU 31 writes the created client certificate into the flash memory 33 as the built-in memory (S180). Then, control proceeds to the step S240.

On the other hand, if it is judged that the USB memory 50 is designated as the output destination (S170: YES), control proceeds to the step S190 where the CPU 31 judges whether the USB memory 50 is connected to the USB I/F 45 of the MFP 30. And if it is judged that the USB memory 50 is not connected to the USB I/F 45 (S190: NO), the CPU 31 transmits a web page for indicating an error message to the access source PC 10 (S200), and then terminates the certificate issuance process.

On the other hand, if it is judged that the USB memory 50 is connected to the USB I/F 45 (S190: YES), control proceeds to the step S210 where the CPU 31 reads out a memory ID from the USB memory 50 which is connected to the USB I/F 45. In this regard, a serial number of the USB memory which is recorded in the USB memory 50 may be used as the memory ID.

Additionally, after reading out the memory ID, control proceeds to the step S220 where the CPU 31 encrypts the created client certificate described above by using the read out USB memory 50. Also, after the end of the step S220, control proceeds to the step S230 where the CPU 31 writes the aforementioned encrypted client certificate into the USB memory 50 which is connected to the USB I/F 45. Then, control proceeds to the step S240.

Thus in the step S240, the CPU 31 transmits a web page for displaying a message which is for notifying success of issuance of the client certificate to the access source PC 10, and then terminates this certificate issuance process.

Meanwhile, the client certificate which is written in the flash memory 33 according to the certificate issuance process functions as a certificate for indicating the range of authority for use for an unspecified user. Also, the USB memory 50 in which the client certificate is written according to the certificate issuance process is passed to the corresponding user, and functions as a certificate for indicating the range of authority for use for a specified user.

Specifically, when an administrator intends to grant an authority for use of the MFP 30 to a specified user, as shown in FIG. 5, the administrator operates the client certificate issuance screen through the PC 10, and sets the range of authority for use to grant the user by using the aforementioned check boxes. And the administrator instructs the MFP 30 to issue a client certificate to the USB memory 50 by pressing "ISSUE" button in a condition that the radio button of the "USB memory" is checked. As described above, upon receiving the instructs, the CPU 31 of the MFP 30 outputs the client certificate with the information of authority for use for indicating the range of the designated authority for use and attached with a digital signature to the USB memory 50. Thus, an administrator grants authority for use of the MFP 30 to the specified user by passing the USB memory 50 to the corresponding user.

Figure 6A:
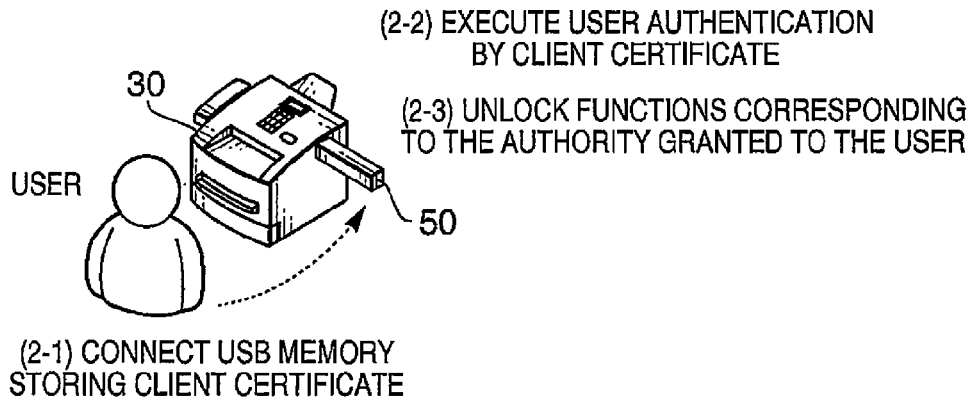
FIGS. 6A and 6B are explanatory illustrations showing a technique to use a USB memory which is written with the client certificate.
Figure 6B:
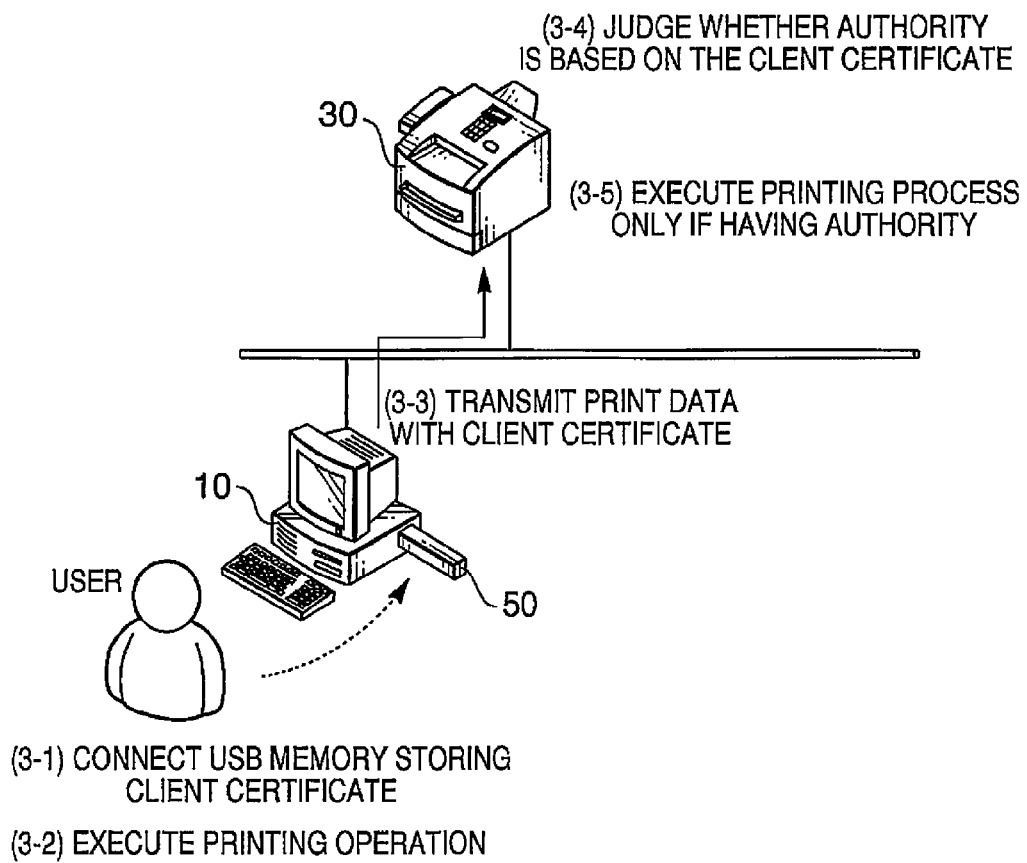

Therefore, as shown in FIGS. 6A and 6B, the USB memory 50 which was passed to the specified user is to be used by connecting to the USB I/F 45 in the MFP 30, or the USB I/F 21 in the PC10.

Thus, the MFP 30 according to the embodiment is configured such that when the USB memory 50 is connected to the USB OF 45 of the MFP 30 in the periods other than the execution time of the aforementioned certificate issuance process, the user authentication is to be executed based on the client certificate stored in the USB memory 50, and if the client certificate is a valid client certificate, unlocks the use restriction of the corresponding functions to the authority granted to the user based on the information of authority for use indicated by the client certificate (as will hereinafter be described in detail). Therefore, by connecting the USB memory 50 to the USB I/F 45 of the MFP 30, as shown in FIG. 6A, a user can use the MFP 30 within the range of authority for use granted to the user.

Additionally, the MFP 30 according to the embodiment is configured such that upon receiving a printing instruction and print data, executes user authentication based on the client certificate which is attached with the print data, and if the client certificate is a valid client certificate and indicates the user has an authority for use on the corresponding functions to the printing instruction, executes a printing process of the received print data (as will hereinafter be described in detail). Therefore, by connecting the USB memory 50 to the USB I/F 21 of the PC 10 and by transmitting the client certificate stored in the USB memory 50, as shown in FIG. 6B, a user can use the MFP 30 to execute the printing process of the print data.

Figure 7:
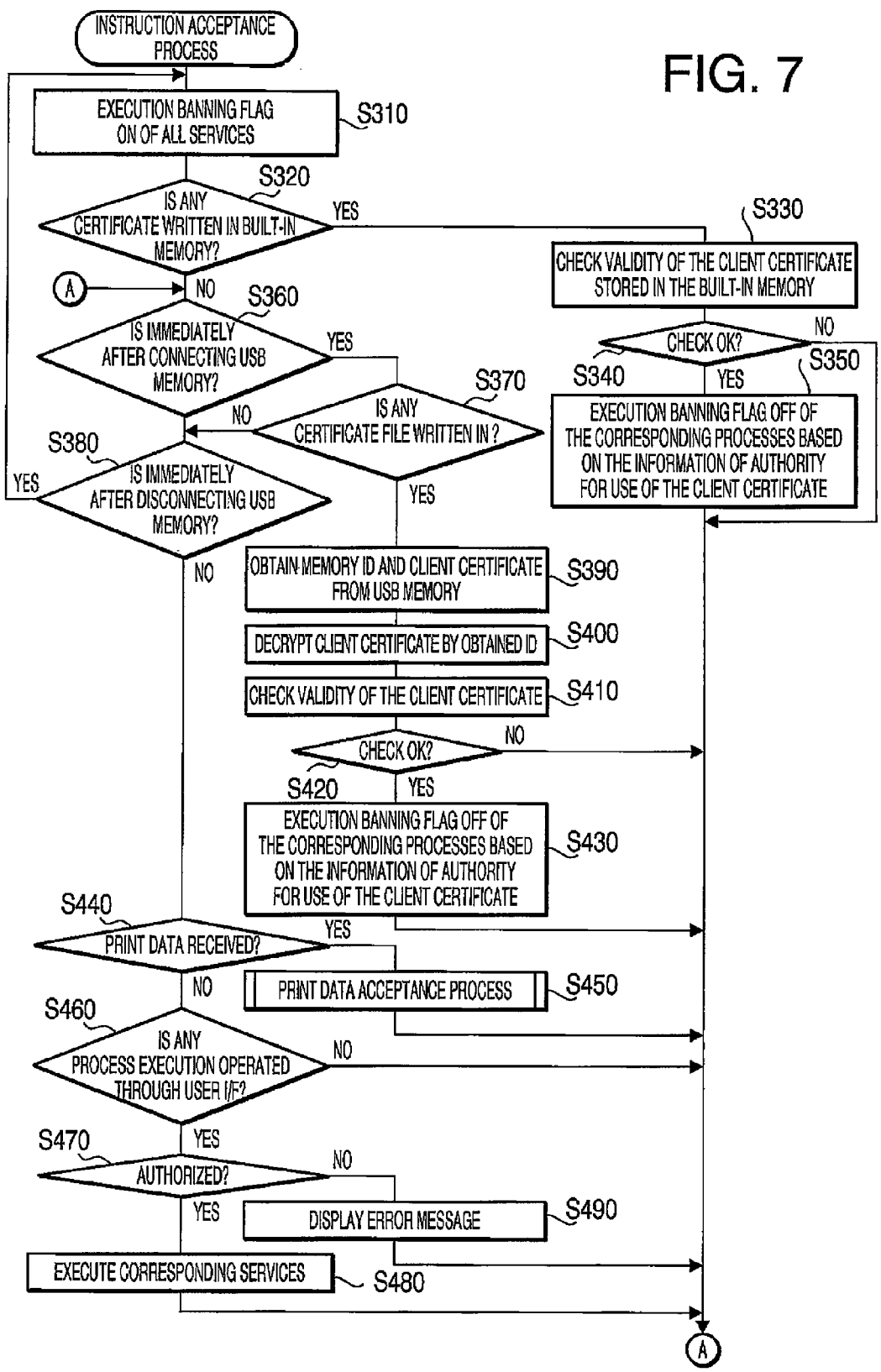
FIG. 7 is a flowchart showing an instruction acceptance process to be executed by the multifunction peripheral.

Next, operation of the MFP 30 shown in FIGS. 6A and 6B will be explained in more detail. FIG. 7 is a flowchart showing an instruction acceptance process in which the CPU 31 starts execution based on the main program stored in the flash memory 33 at the activation of the MFP 30.

At the start of a certificate issuance process, first the CPU 31 sets all the execution banning flags for ON for every process which the MFP 30 is able to execute (i.e., a management tool providing process, a monochrome printing process, a color printing process, a scanner process, a monochrome copying process, a color copying process, and a FAX transmission process), and the CPU 31 bans execution of all the processes above (S310).

After the end of the step, the CPU 31 judges whether the client certificate is written in the flash memory 33 (S320). If the client certificate is judged as not written in a flash memory 33 (S320: NO), control proceeds to the step S360.

On the other hand, if the client certificate is judged as written in the flash memory 33 (S320: YES), the CPU 31 checks the validity of the client certificate by reading out the client certificate stored in the flash memory 33 (S330). Specifically, the CPU 31 decrypts the digital signature information of the corresponding client certificate by the server public key of the MFP 30, and judges whether the hash value indicated in the digital signature information and the hash value derived from other information in the client certificate are matched.

Subsequently, if the hash value indicated in the digital signature information and the hash value derived from other information in the client certificate are matched, the CPU 31 judges the client certificate as the valid client certificate issued from the MFP 30 without having been tampered (S340: YES), and sets each execution banning flag in OFF of the process corresponding to the parameter of which value is set in "permission of use (OK)" in the information of authority for use of the client certificate (S350). For example, in the case that the parameters which indicate availability of the monochrome printing function and availability of the color printing function indicate as "permission of use (OK)", the CPU 31 sets the execution banning flags in OFF of the corresponding processes, the monochrome printing process and the color printing process. Then, after the end of the step S350, control proceeds to the step S360. On the other hand, if the client certificate stored in the flash memory 33 is judged as not the valid client certificate (S340: NO), control proceeds to the step S360 without executing the step S350.

Additionally, in the step S360, the CPU 31 judges whether it is immediately after connecting of the USB memory 50 to the USB I/F 45. To put it plainly, in the case that although the USB memory 50 is connected to the USB I/F 45 at the current moment, the USB memory 50 was not connected to the USB I/F 45 at the time of the last execution of the step S360, the CPU 31 judges it as the immediately after connecting of the USB memory 50 (S360: YES). Adversely, in the case that the USB memory 50 is not connected to the USB I/F 45 at the current moment, or it was judged as YES at the last execution of the step S360, the CPU 31 judges it as not the immediately after connecting of the USB memory 50 (S360: NO).

If it is judged as not the immediately after connecting of the USB memory 50 to the USB I/F 45 (S360: NO), control proceeds to the step S380. On the other hand, if it is judged as the immediately after connecting of the USB memory 50 to the USB I/F 45 (S360: YES), control proceeds to the step S370.

Subsequently, in the step S370, the CPU 31 judges whether the client certificate is written in the USB memory 50 which is connected to the USB I/F 45. If it is judged that the client certificate is not written in the USB memory 50 (S370: NO), control proceeds to the step S380. If it is judged that the client certificate is written in the USB memory 50 (S370: YES), control proceeds to the step S390.

In the step S390, the CPU 31 reads out the memory ID and the client certificate from the USB memory 50 which is connected to the USB I/F 45, and decrypts the client certificate read out from the USB memory 50 by the read out memory ID (S400). And the CPU 31 checks the validity of the client certificate based on the decrypted client certificate, in the similar, technique to the step 330 (S410).

And if the decrypted client certificate is judged as the valid client certificate issued from the MFP 30 without having been tampered (S420: YES), the CPU 31 sets each execution banning flag in OFF of the process corresponding to the parameter of which value is set in "permission of use (OK)" in the information of authority for use of the client certificate (S430). In this regard, the CPU 31 sets other execution banning flags in OFF which should be set in OFF, while holding the execution banning flags in OFF which are already set in OFF, in the step S430. After the end of the step S430 as described above, control proceeds to the step S360.

On the other hand, if the decrypted client certificate is judged as tampered and not the valid client certificate issued from the MFP 30 (S420: NO), control proceeds to the step S360 without executing the step S430.

Subsequently, after judging NO in the step S360 or S370, control proceeds to the step S380 where the CPU 31 judges whether it is immediately after disconnecting the USB memory 50 from the USB I/F 45. To put it plainly, in the case that although the USB memory 50 was connected to the USB I/F 45 at the time of the last execution of the step S380, the USB memory 50 is not connected to the USB I/F 45 at the current moment, the CPU 31 judges it as the immediately after disconnecting of the USB memory 50 (S380: YES). Adversely, in the case that the USB memory 50 is connected to the USB I/F 45 at the current moment, or it was judged as YES at the last execution of the step S380, the CPU 31 judges it as not the immediately after disconnecting of the USB memory 50 (S380: NO).

If it is judged as the immediately after disconnecting of the USB memory 50 from the USB I/F 45 (S380: YES), control proceeds to the step S310 where the CPU 31 sets all the execution banning flags in ON of every process.

Figure 8:
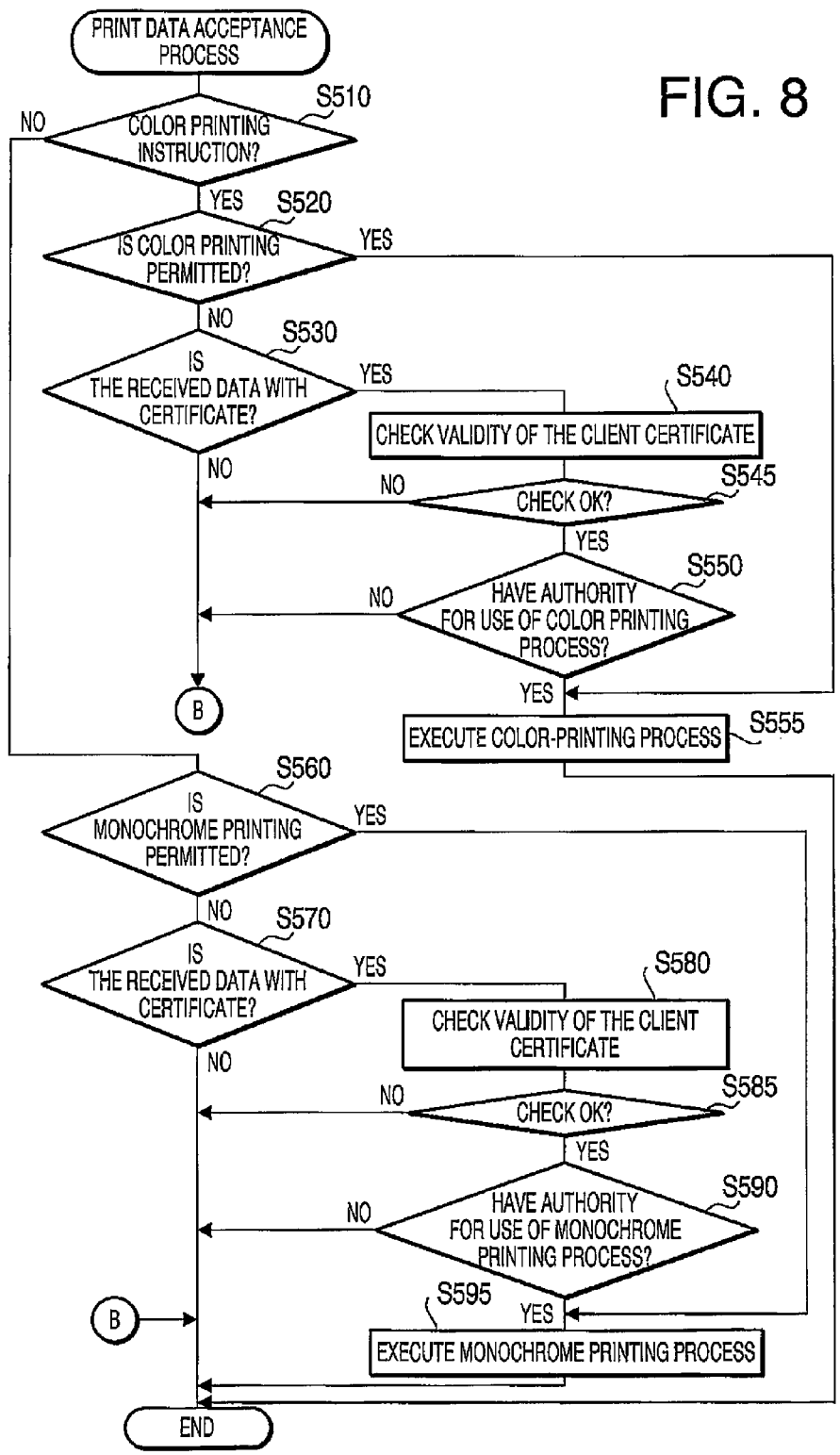
FIG. 8 is a flowchart showing a print data acceptance process to be executed by the multifunction peripheral.

On the other hand, if it is judged as not the immediately after disconnecting of the USB memory 50 from the USB I/F 45 (S380: NO), control proceeds to the step S440 where the CPU 31 judges whether the CPU 31 has received a printing instruction and print data from any external PC 10 through the communication I/F 35. And if it is judged that the PC 10 received the printing instruction and the print data from an external PC 10 (S440: YES), the CPU 31 executes a print data acceptance process (step S450). In this regard, FIG. 8 is a flowchart showing the print data acceptance process executed under control of the CPU 31 of the MFP 30.

At the start of the print data acceptance process, the CPU 31 judges whether the received printing instruction is a color printing instruction (S510), and if the received instruction is judged as a color printing instruction (S510: YES), judges whether execution of the color printing process is authorized in the step S520. Herein, the CPU 31 judges that execution of the color printing process is authorized if the execution banning flag of color printing process is set in OFF (S520: YES). The CPU 31 judges that execution of the color printing process is not authorized if the execution banning flag of color printing process is set in ON (S520: NO).

If it is judged that the execution of color printing process is authorized (S520: YES), the CPU 31 executes the color printing process in the step S555, and forms color print images on paper based on the received print data through the printing unit 39. And then, the print data acceptance process is to be terminated.

On the other hand, if it is judged that the execution of color printing process is not authorized (S520: NO), the CPU 31 judges whether the received print data is the print data attached with a client certificate in the step S530, and if the received print data is judged as the print data attached with a client certificate (S530: YES), the CPU 31 checks the validity of the client certificate in the similar technique to the step 330 (S540). Then, if the aforementioned client certificate received with the print data is judged as a valid client certificate (S545: YES), control proceeds to the step S550. If the client certificate received with the print data is judged as not a valid client certificate (S545: NO), the print data acceptance process is to be terminated. Meanwhile, this embodiment is intended for only execution of the processes which are authorized with the valid certificate.

In the step S550, the CPU judges whether the user who transmitted the print data has an authority for use of the color printing process by judging whether the parameter which indicates availability of the color printing function in the aforementioned client certificate received with the print data indicates a value "permission of use (OK)". If the user is judged as having authority for use of color printing process (S550: YES), control proceeds to the step S555 where the CPU 31 executes the color printing process, then forms color images on paper based on the received print data through the printing unit 39. And then, this print data acceptance process is to be terminated.

On the other hand, if the user who transmitted the print data is judged as not having authority for use of color printing process (S550: NO), the CPU 31 terminates this print data acceptance process without executing the color printing process.

If the received instruction is judged as a monochrome printing instruction (S510: NO), control proceeds to the step S560 where the CPU 31 judges whether execution of the monochrome printing process is authorized. Herein, the CPU 31 judges execution of the monochrome printing process is authorized when the execution banning flag of monochrome printing process is set in OFF (S560: YES), and judges execution of the monochrome printing process is not authorized when the execution banning flag of monochrome printing process is set in ON (S560: NO).

If it is judged that the execution of monochrome printing process is authorized (S560: YES), the CPU 31 executes the monochrome printing process in the step S595, and forms monochrome print images on paper based on the received print data through the printing unit 39. And then, this print data acceptance process is to be terminated.

On the other hand, if it is judged that the execution of monochrome printing process is not authorized (S560: NO), the CPU 31 judges whether the received print data is judged as the print data attached with a client certificate in the step S570. If the received print data is the print data attached with a client certificate (S570: YES), the CPU 31 checks the validity of the client certificate in the similar technique to the step 330 (S580).

Then, if the aforementioned client certificate received with the print data is judged as a valid client certificate (S585: YES), control proceeds to the step S590. If the client certificate received with the print data is judged as not a valid client certificate (S585: NO), this print data acceptance process is to be terminated.

In the step S590, the CPU 31 judges whether the user who transmitted the print data has an authority for use of the monochrome printing process by judging whether the parameter which indicates availability of the monochrome printing function in the aforementioned client certificate received with the print data indicates a value "permission of use (OK)". If the user is judged as having authority for use of monochrome printing process (S590: YES), the CPU 31 forms monochrome print images on paper based on the received print data through the printing unit 39 in the step S595. And then, this print data acceptance process is to be terminated.

On the other hand, if the user who transmitted the print data is judged as not having authority for use of monochrome printing process (S590: NO), the CPU 31 terminates this print data acceptance process without executing the monochrome printing process. After the print data acceptance process is executed in the step S450, control proceeds to the step S360.

If it is judged that the PC 10 has not received the printing instruction and the print data from an external PC 10 through the communication I/F 35 (S440: NO), control proceeds to the step S460 where the CPU 31 judges whether any input of execution instruction occurred through the user I/F 43 of the MFP 30 among a color copying process, a monochrome copying process, a scanning process, and a FAX transmission process (that is any one of a color copying instruction, a monochrome copying instruction, and a scanning instruction, and a FAX transmission instruction) (S460). If it is judged that no input of execution instruction of aforementioned processes occurred through the user I/F 43 (S460: NO), control proceeds to the step S360.

On the other hand, if it is judged that any input of execution instruction of aforementioned processes occurred through the user I/F 43 (S460: YES), the CPU 31 judges whether execution of the process corresponding to the inputted instruction of the step S470 is authorized (S470). Specifically, the CPU 31 judges the execution of the process corresponding to the inputted instruction is authorized if the execution banning flag corresponding to the inputted instruction is set in OFF (S470: YES), and judges the execution of the process corresponding to the inputted instruction is not authorized if the execution banning flag of corresponding to the inputted instruction is set in ON (S470: NO).

Therefore, if it is judged that the execution of the process corresponding to the inputted instruction is authorized (S470: YES), the CPU 31 executes the process corresponding to the instruction (S480). Specifically, if an input of a color copying instruction occurred, the CPU 31 executes a color copying process. If an input of a monochrome copying instruction occurred, the CPU 31 executes a monochrome copying process. If an input of a scanning instruction occurred, the CPU 31 executes a scanning process. If an input of a FAX transmission instruction occurred, the CPU 31 executes a FAX transmission process. And then, the process proceeds to the step S360.

In addition, in the step S470, if it is judged that an execution of the process corresponding to the inputted instruction is not authorized (S470: NO), control proceeds to the step S490 where the CPU 31 indicates an error message on the display unit of the user I/F 43. And then, the process proceeds to the step S360.

Hereinabove, the communication system 1 according to the first embodiment has been described, and according to this communication system 1, when the MFP 30 obtains the input result of a client certificate issuance screen from an administrator through the communication I/F 35 (S140: equivalent to a designated information obtaining system), creates a client certificate (digital certificate) with a digital signature written with the information of authority for use which indicates range of authority for use designated by the administrator based on the input result (S150), and outputs the client certificate to the output destination unit which is designated by the administrator (S180, S210-S230: equivalent to a certificate outputting system).

Specifically, when the USB memory 50 (equivalent to a portable storage unit) is designated as the output destination based on the input result of the client certificate issuance screen received from the PC 10, the MFP 30 writes the client certificate in the USB memory 50 connected to the USB I/F 45 (equivalent to a connecting port), and when a built-in memory is designated as the output destination, writes the client certificate in the built-in flash memory 33. In this regard, when writing the client certificate in the USB memory 50, the MFP 30 reads out the memory ID which is the unique identification code of the unit (USB memory) recorded in the USB memory 50 as writing-in destination (S210), and encrypts the client certificate based on the memory ID (S220), then writes the encrypted client certificate in the USB memory 50 (S230).

Subsequently, when the USB memory 50 is connected to the USB I/F 45 in periods other than the execution time of the certificate issuance process (S360: YES), the MFP 30 obtains the client certificate and the memory ID which are stored in the USB memory 50 (S390: equivalent to a certificate obtaining system), and decrypts the client certificate obtained from the USB memory 50 by the memory ID, then judges whether the client certificate obtained from the USB memory 50 is a valid client certificate based on the decrypted client certificate (S400-S420: equivalent to a validity judgment system).

If the decrypted client certificate is judged as the valid client certificate (S420: YES), the MFP 30 selectively sets the execution banning flags in OFF of the corresponding processes in order to authorize execution of the processes which are set in "permission of use (OK)" indicated with the information of authority for use written in the aforementioned valid client certificate selectively among a plurality of processes which the MFP 30 is capable of execution (S430: equivalent to an authorization system). In this regard, the MFP 30 holds the execution banning flags in OFF of the corresponding processes during the obtainable period of the valid client certificate from the USB memory 50 continuously. If the USB memory 50 is removed from the MFP 30 and becoming unobtainable of the client certificate from the USB memory 50, the MFP 30 sets the execution banning flags (which is in OFF state) for ON again so that the MFP 30 authorizes execution of the processes only in the obtainable period of the valid client certificate from the USB memory 50.

Thus, the MFP 30 executes the processes of which the execution banning flags are set in OFF according to the inputted execution instruction from the user side through the user I/F 43 (S480, S555, S595: equivalent to a process execution system), while not executes the processes of which the execution banning flags are set in ON even if the execution instruction of the processes is inputted from the user side.

Therefore, according to the embodiment, the range of authority for use of the MFP 30 is written in the digital certificate (client certificate) in order to execute the processes which belong to the range of authority for use written in the valid digital certificate selectively according to the instruction from the user side, and that unauthorized use such as by tampering of the information indicating the range of authority for use may not occurred in the MFP 30. Thus, according to the embodiment, unauthorized use of the MFP 30 such as by tampering of information indicating the range of authority for use may be prevented more securely.

Moreover, according to the embodiment, the digital certificate is issued with respect to each user, and each different authority for use is granted to every user, so that it is not necessary to ask a user for inputting IDs such as password. Thus, according to the embodiment, it is capable of switching between execution/un-execution with respect to each user without forcing troublesome operations upon users.

Additionally, if the client certificate is stored in the flash memory 33 as a built-in memory, the MFP 30 according to the embodiment reads out the client certificate stored in the flash memory 33 (S330: equivalent to a certificate obtaining system), and checks the validity of the client certificate. If the client certificate stored in the flash memory 33 is a valid client certificate, the MFP 30 sets the execution banning flags in OFF of the processes which are set in "permission of use (OK)" indicated with the information of authority for use written in the client certificate (S350: equivalent to an authorization system), and authorizes the corresponding processes during the obtainable period of the client certificate from the flash memory 33 continuously.

Thus, according to the embodiment, the information indicating the range of authority for use is to be stored in the a digital certificate (client certificate) even in the case of authorizing execution of some processes selectively to unspecified users so that unauthorized use of the MFP 30 such as by tampering of information indicating the range of authority for use may be prevented securely.

According to the embodiment, the execution banning flag is to be set in OFF based on client certificate in the flash memory 33, and the execution banning flag is to be set in ON based on the client certificate in the USB memory 50, so that even an unspecified user whom the digital certificate is not issued may use some processes, and the users whom the digital certificate is issued may use wider range of processes corresponding to the user based on the digital certificate.

Further, according to the embodiment, when the client certificate is transmitted together with the printing instruction and the print data from an PC 10, the client certificate is received together with the printing instruction and the print data through the communication I/F 35 (S440: equivalent to a certificate obtaining system), and if the received client certificate is a valid client certificate, and the client certificate has the information of authority for use which is set in "permission of use (OK)" on the corresponding process to the instruction, the printing instruction is to be accepted so as to execute the corresponding printing process, and to form print images on paper based on the print data through the printing unit 39 (S555, S595).

Therefore, according to the embodiment, a user can use the printing process by merely transmitting a client certificate through the communication I/F 35, even without connecting the USB memory 50 to the MFP 30.

Furthermore, according to the embodiment, the client certificate is encrypted by using the memory ID for writing the client certificate in the USB memory 50 that allows to find whether the client certificate has been copied to any other USB memory 50, by checking whether decryption can be executed normally. Thus, according to the embodiment, the client certificate as an electrical entity can be associated one to one with the USB memory 50, therefore occurrence of misuse of the MFP 30 such as by a fraud copy of the client certificate may be prevented.

Figure 9:
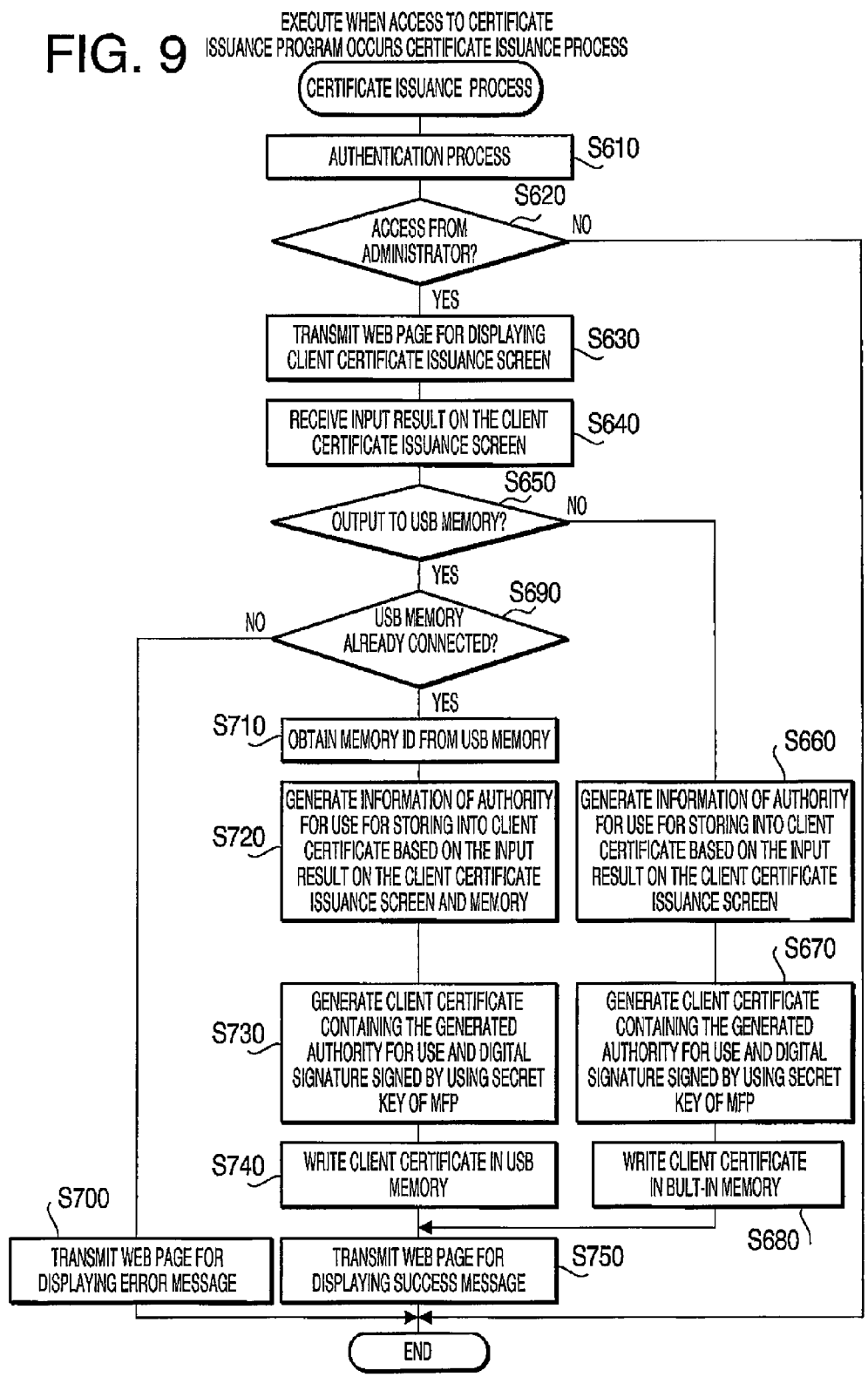
FIG. 9 is a flowchart showing a certificate issuance process to be executed by the multifunction peripheral according to a second embodiment.
Figure 10:
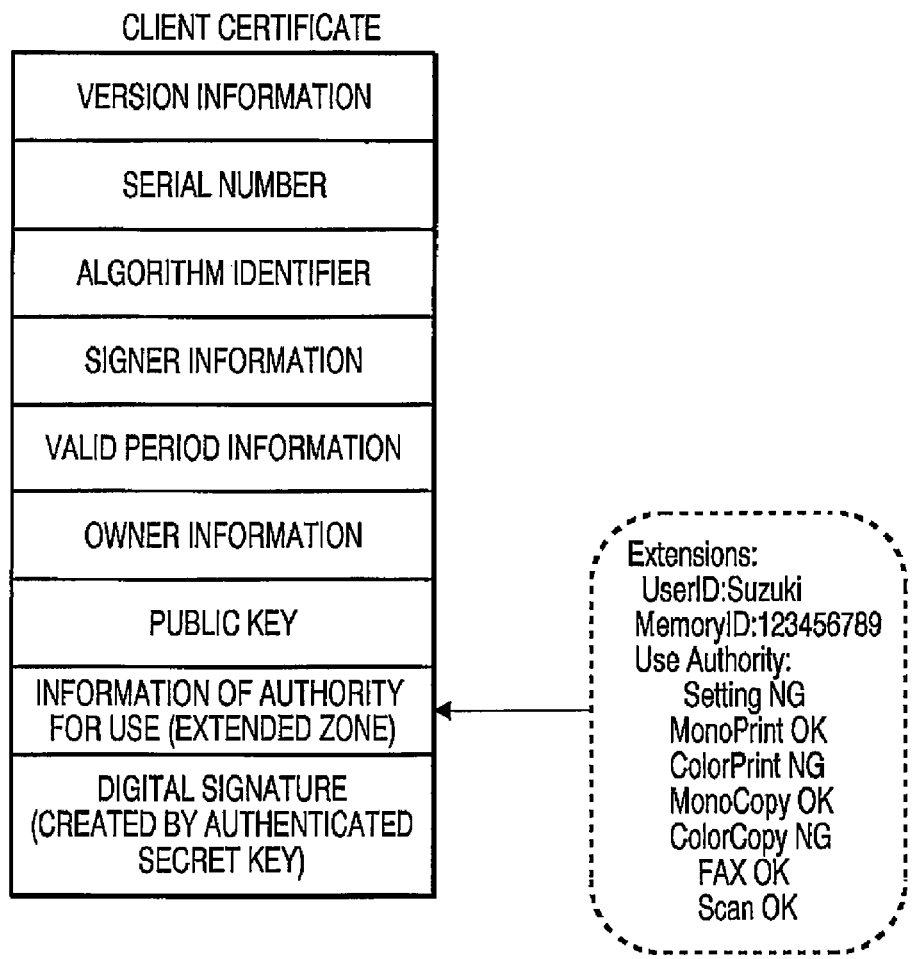
FIG. 10 is a schematic diagram showing a configuration of a client certificate to be generated by the multifunction peripheral in the certificate issuance process.
Figure 11:
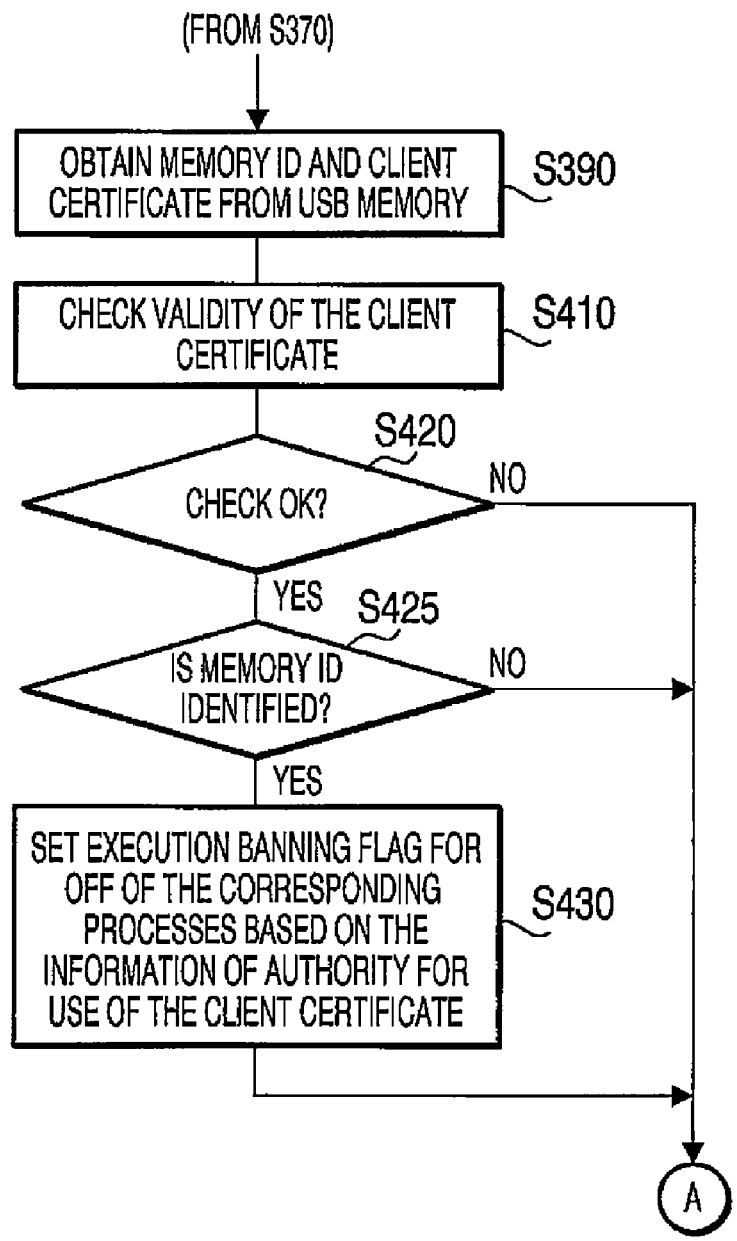
FIG. 11 is a flowchart showing a partially extracted instruction acceptance process to be executed by the multifunction peripheral according to the second embodiment.

Meanwhile, although an embodiment of encrypting and decrypting a client certificate based on a memory ID recorded on a USB memory 50 has been described in the first embodiment, an identical effect to the aforementioned technique can be obtained to create a client certificate written with a memory ID as the information of authority for use. Therefore, the MFP 30 may be configured to create a client certificate which is written with a memory ID Second Embodiment FIG. 9 is a flowchart showing a certificate issuance process to be executed by the CPU 31 of the MFP 30 in the communication system 1 according to the second embodiment; FIG. 10 is a schematic diagram showing a configuration of a client certificate to be generated in the step S730 of the certificate issuance process; and FIG. 11 is a flowchart showing a partially extracted instruction acceptance process to be executed by the CPU 31 of the MFP 30 according to the second embodiment.

The communication system 1 according to the second embodiment is different barely on details in the certificate issuance process and the instruction acceptance process and the configuration of the client certificate from the first embodiment, and has almost the same configuration with the communication system 1 according to the first embodiment. Therefore, in the communication system 1 according to the second embodiment, hereinafter only on details in the certificate issuance process and the instruction acceptance process to be executed by the CPU 31 of the MFP 30 and the configuration of the client certificate will be described.

At the start of the certificate issuance process shown in FIG. 9, the CPU 31 of the MFP 30 according to the second embodiment executes an authentication process in the same technique as the step S110 (S610), and judges whether the user who operates the access source PC 10 is an administrator (S620). And if the user who operates the access source PC 10 is judged as not an administrator (S620: NO), the CPU 31 terminates this certificate issuance process, and rejects access from the aforementioned access source PC 10.

On the other hand, in the case that the user who operates the access source PC 10 is judged as an administrator (S620: YES), the CPU 31 transmits a web page (certificate issuance page) for displaying a client certificate issuance screen shown in FIG. 4 to the access source PC 10 through the communication OF 35(S630). Then, after the end of the step, the CPU 31 stands by until the data (POST request) written with the value of each input object (input value) which configures a client certificate issuance screen is to be transmitted from the access source PC 10.

And when receiving the data in which the value of aforementioned respective input objects are written from the PC 10 (S640), the CPU 31 judges whether the USB memory 50 is designated as the output destination of the client certificate by the user (administrator) based on the value (value showing checked/unchecked) of the radio buttons contained in the data (S650).

Then, if it is judged that not the USB memory 50 but the built-in memory is designated as the output destination (S650: NO), the CPU 31 writes the user ID according to the values of the text boxes indicated by the aforementioned data, and generates information of authority for use which is written with the values of corresponding parameters according to the values of respective check boxes (S660), also generates a client certificate which is stored with the information of authority for use that is the client certificate configured as shown in FIG. 2 and signed with a digital signature by the server secret key of the MFP 30 (S670). And after the end of the step, the CPU 31 writes the client certificate created in the step S670 in the flash memory 33 as built-in memory (S680). And then, control proceeds to the step S750.

On the other hand, in the step S650, if it is judged that the USB memory 50 is designated as the output destination of a client certificate from the user (administrator) (S650: YES), control proceeds to the step S690 where the CPU 31 judges whether the USB memory 50 is connected to the USB I/F 45 of the MFP 30. And if it is judged that the USB memory 50 is not connected to the USB I/F 45 (S690: NO), the CPU 31 transmits a web page for indicating an error message to the access source PC 10 (S700), and then, terminates this certificate issuance process.

If it is judged that the USB memory 50 is connected to the USB I/F 45 (S690: YES), control proceeds to the step S710 where the CPU 31 reads out the memory ID from the USB memory 50 connected to the USB I/F 45. Then, cpntrol proceeds to the step S720. Then in the step S720, the CPU 31 writes a user ID according to the value of the text box indicated by the data received from the PC 10 in the step S640, and generates information of authority for use which is written with the values of corresponding parameters according to the values of respective check boxes and also that is the information of authority for use written with the memory ID. Then, after the end of the step S720, the CPU 31 creates a client certificate which is stored with the information of authority for use that is the client certificate configured as shown in FIG. 10 and signed with a digital signature by the server secret key of the MFP 30 (S730).

Specifically, the CPU 31 creates a client certificate which is written with a user ID of the owner, a memory ID of the output designation USB memory 50, a parameter value which indicates whether the management tool providing function is available or unavailable, a parameter value which indicates whether a monochrome printing function is available or unavailable, a parameter value which indicates whether a color printing function is available or unavailable, a parameter value which indicates whether a monochrome copying function is available or unavailable, a parameter value which indicates whether a color copying function is available or unavailable, a parameter value which indicates whether a FAX transmission function is available or unavailable, and a parameter value which indicates whether scanning function is available or unavailable, as the information of authority for use. The client certificate to be created in the step S730 is different barely on the information of authority for use from the client certificate shown in FIG. 2, and has almost the same configuration with the client certificate shown in FIG. 2.

After creating the client certificate in the step S730, control proceeds to the step S740 where the CPU 31 writes the created client certificate in the aforementioned USB memory 50 which is connected to the USB I/F 45. Then, in the step S750, the CPU 31 transmits a web page for displaying a message which is for notifying success of issuance of the client certificate to the access source PC 10, and then terminates this certificate issuance process.

Additionally, at the start of an instruction acceptance process according to the second embodiment, the CPU 31 executes almost the same process as the instruction acceptance process shown in FIG. 7, however if the process proceeded to the step S390, as shown in FIG. 11, the CPU 31 reads out the memory ID and the client certificate from the USB memory 50 which is connected to the USB I/F 45, and checks the validity of the client certificate read out from the USB memory 50, in the similar technique to the step 330 (S410).

And if the client certificate read out from the USB memory 50 is judged as not the valid client certificate (S420: NO), control proceeds to the step S360, and if the client certificate read out from the USB memory 50 is judged as the valid client certificate (S420: YES), control proceeded to the step S425.

Subsequently, in the step S425, the CPU 31 judges whether the memory ID which is indicated by the client certificate and the memory ID read out from the USB memory 50 in the step S390 are matched, and if the both of the memory IDs are judged as matched (S425: YES), sets each execution banning flag in OFF of the process corresponding to the parameter of which value is set in "permission of use (OK)" in the information of authority for use of the client certificate (S430). Then, control proceeded to the step S360. If the both of the memory IDs are judged as not matched (S425: NO), control proceeds to the step S360 without executing the step S430.

Hereinabove, the communication system 1 according to the second embodiment has been described, and according to the communication system 1, before outputting a client certificate to the USB memory 50 in a certificate issuance process, the CPU 31 generates a client certificate attached with a digital signature (digital certificate) written with the memory ID recorded on the information of authority for use and the USB memory 50 of the output destination, and outputs the client certificate to the USB memory 50 (S710-S740: equivalent to a certificate outputting system).

Further, according to the embodiment, when reading out the client certificate from the USE memory 50, the client certificate is obtained together with the memory ID, and the memory ID is to be judged whether matched with the memory ID written in the client certificate (S390-S425: equivalent to a validity judgment system), and if the both of the memory IDs are judged as not matched (S425: NO), the client certificate is equated with invalid certificate even if the client certificate is issued from the MFP 30 without having been tampered. Thus, according to the embodiment, as same as the first embodiment, occurrence of misuse of the MFP 30 such as by a fraud copy of the client certificate may be prevented.

Thus far described, although aspects of the information processing apparatus and program thereof of the present invention are not to be limited to the embodiments described above, and further various aspects may be adopted. For example, according to the aforementioned embodiments, it has been described that the MFP 30 is incorporated with functions as an information processing apparatus of the present invention, however, the present invention is not to be limited to the digital MFP, but wider variety of information processing apparatuses may be applied.

What is claimed is:

1. A printer capable of communicating with an external device via a network and configured to execute a plurality of print instructions, comprising:

a process execution unit configured to execute a print process corresponding to a print instruction received from the external device via the network;

an obtaining unit configured to obtain, substantially concurrently, the print instruction, print data, and a digital certificate from the external device via the network, the digital certificate describing a range of processes which are permitted to be executed;

a validity judgment unit configured to judge whether the digital certificate, which was obtained substantially concurrently with the print instruction and the print data by the obtaining unit, is valid based on a digital signature attached to the digital certificate;

an authorization unit configured such that, if the digital certificate, which was obtained substantially concurrently with the print instruction and print data by the obtaining unit, is judged to be valid by the validity judgment unit and if the print process corresponding to the print instruction is within the range of processes which are permitted to be executed, the authorization unit authorizes the process execution unit to execute the print process on the print data obtained with the valid digital certificate;

an internal storage unit configured to store the digital certificate describing the range of processes which are permitted to be executed;

a process judgment unit configured to make a judgment whether the print process corresponding to the print instruction is within the range of processes which are permitted to be executed described in the digital certificate stored in the internal storage unit, in response the obtaining unit obtaining the print instruction, wherein if the process judgment unit judges that the print process corresponding to the print instruction is within the range of processes which are permitted to be executed described in the digital certificate stored in the internal storage, the authorization unit authorizes the process execution unit to execute the print process corresponding to the obtained print instruction with respect to the print data obtained with the print instruction regardless of whether the digital certificate has been received from the external device by the obtaining unit, and if the process judgment unit judges that the print process corresponding to the print instruction is not within the range of processes which are permitted to be executed, described in the digital certificate stored in the internal storage, the authorization unit authorizes the process execution unit to execute the print process corresponding to the obtained print instruction with respect to the print data obtained with the valid digital certificate, when the valid digital certificate is received from the external device by the obtaining unit and the print process corresponding to the print instruction is within the range of processes which are permitted to be executed of the valid digital certificate.

2. The printer according to claim 1, further comprising:

a designated information obtaining unit configured to obtain designated information via the network, the designated information including data relating to the range of processes which are permitted to be executed; and a certificate outputting unit configured to generate the digital certificate with the digital signature, the digital certificate including the range of processes which are permitted to be executed designated by the designated information obtained by the designated information obtaining unit, and to output the generated digital certificate to a predetermined destination device.

3. The printer according to claim 2, wherein:

the predetermined destination device is an external unit configured to communicate with the printer;

the process execution unit is configured to execute the print process corresponding to the print instruction inputted from the external unit; and the obtaining unit is configured to obtain the digital certificate from the external unit.

4. The printer according to claim 2, further comprising a port removably connectable with a portable storage unit, wherein:

the certificate outputting unit is configured to output the generated digital certificate to the portable storage unit through the port; and the obtaining unit is configured to obtain the digital certificate, which was output to the portable storage unit.

5. The printer according to claim 4, wherein:

the designated information includes information to designate as the predetermined destination device a built-in storage unit in the printer or the portable storage unit connected to the port;

the certificate outputting unit is configured to output the generated digital certificate to a storage unit indicated in the designated information;

the obtaining unit is configured to obtain the digital certificate from the portable storage unit when the portable storage unit is connected to the port;

the obtaining unit is further configured to obtain the digital certificate from the built-in storage unit if the digital certificate is stored in the built-in storage unit; and the authorization unit is configured to authorize the process execution unit to execute the print process during a capable period for obtaining the valid digital certificate from the portable storage unit, if the print process is within at least one of the range of processes which are permitted to be executed of the digital certificate obtained from the built-in storage unit and the range of processes which are permitted to be executed of the digital certificate obtained from the portable storage unit, if both the digital certificate obtained from the built-in storage unit and the digital certificate obtained from the portable storage unit are valid.

6. The printer according to claim 4, wherein:

the portable storage unit stores an identification code unique to the portable storage unit;

the certificate outputting unit is configured to encrypt the digital certificate based on the identification code and then to output the encrypted digital certificate to the portable storage unit; and the validity judgment unit is configured to decrypt the encrypted digital certificate based on the identification code stored in the portable storage unit, wherein the validity judgment unit is further configured to judge whether the digital certificate is valid based on the decrypted digital certificate if the obtaining unit obtained the encrypted digital certificate from the portable storage unit.

7. The printer according to claim 4, wherein:

the portable storage unit stores an identification code unique to the portable storage unit;

the certificate outputting unit is configured to generate the identification code and to output the digital certificate with the digital signature and the identification code to the portable storage unit; and the validity judgment unit is configured to judge whether the digital certificate is valid based on the digital signature and the identification code of the digital certificate if the obtaining unit obtained the digital certificate from the portable storage unit, wherein the validity judgment unit is further configured to judge that the digital certificate is not valid when the identification code of the digital certificate obtained by the certificate obtaining unit does not match the identification code stored in the portable storage unit.

8. A method for authorization of process execution to be implemented on a computer functioning as a printer having a process execution unit to execute a plurality of print processes and capable of communicating with an external device via a network, comprising:

obtaining, substantially concurrently, a print instruction, print data, and a digital certificate from the external device via the network, the digital certificate describing a range of processes which are permitted to be executed;

judging whether the digital certificate, which was obtained substantially concurrently with the print instruction and the print data, is valid based on a digital signature attached to the digital certificate;

authorizing the process execution unit to execute the print process on the print data obtained with the valid digital certificate, if the digital certificate, which was obtained substantially concurrently with the print instruction and print data, is judged to be valid and if the print process corresponding to the print instruction is within the range of processes which are permitted to be executed;

storing the digital certificate describing the range of processes which are permitted to be executed; and performing, in response to obtaining the print instruction, a judgment regarding whether the print process corresponding to the print instruction is within the range of processes which are permitted to be executed described in the digital certificate stored in the internal storage unit, wherein if the performing a judgment step judges that the print process corresponding to the print instruction is within the range of processes which are permitted to be executed described in the digital certificate stored in the internal storage, authorizing the process execution unit to execute the print process corresponding to the obtained print instruction with respect to the print data obtained with the print instruction, regardless of whether the digital certificate has been received from the external device, and if the performing a judgment step judges that the print process corresponding to the print instruction is not within the range of processes which are permitted to be executed, described in the digital certificate stored in the internal storage, authorizing the process execution unit to execute the print process corresponding to the obtained print instruction with respect to the print data obtained with the valid digital certificate, when the valid digital certificate is received from the external device, and the print process corresponding to the print instruction is within the range of processes which are permitted to be executed of the valid digital certificate.

9. A non-transitory computer readable medium having computer readable instructions stored thereon, which, when executed by a computer functioning as a printer having a process execution unit to execute a plurality of print processes and capable of communicating with an external device via a network, are configured to:

obtain, substantially concurrently, a print instruction, print data, and a digital certificate from the external device via the network, the digital certificate describing a range of processes which are permitted to be executed;

judge whether the digital certificate, which was obtained substantially concurrently with the print instruction and the print data, is valid based on a digital signature attached to the digital certificate;

authorize the process execution unit to execute the print process on the print data obtained with the valid digital certificate, if the digital certificate, which was obtained substantially concurrently with the print instruction and print data, is judged to be valid and if the print process corresponding to the print instruction is within the range of processes which are permitted to be executed;

store the digital certificate describing the range of processes which are permitted to be executed; and perform, in response to obtaining the print instruction, a judgment regarding whether the print process corresponding to the print instruction is within the range of processes which are permitted to be executed described in the digital certificate stored in the internal storage unit, wherein if a result of the judgment is that the print process corresponding to the print instruction is within the range of processes which are permitted to be executed described in the digital certificate stored in the internal storage, authorizing the process execution unit to execute the print process corresponding to the obtained print instruction with respect to the print data obtained with the print instruction, regardless of whether the digital certificate has been received from the external device, and if a result of the judgment is that the print process corresponding to the print instruction is not within the range of processes which are permitted to be executed, described in the digital certificate stored in the internal storage, authorizing the process execution.

* * * * *